(12) United States Patent
Monaghan et al.

(10) Patent No.: US 10,853,955 B1
(45) Date of Patent: Dec. 1, 2020

(54) SYSTEMS AND METHODS FOR POINT CLOUD ENCRYPTION

(71) Applicant: Illuscio, Inc., Culver City, CA (US)

(72) Inventors: Robert Monaghan, Ventura, CA (US); Venkatarao Maruvada, Santa Monica, CA (US); Joseph Bogacz, Perth (CA)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 15/929,948

(22) Filed: May 29, 2020

(51) Int. Cl.
*G06T 7/37* (2017.01)
*G06F 21/60* (2013.01)
*G06T 7/38* (2017.01)

(52) U.S. Cl.
CPC .............. *G06T 7/37* (2017.01); *G06F 21/602* (2013.01); *G06T 7/38* (2017.01); *G06T 2207/10028* (2013.01)

(58) Field of Classification Search
CPC ................................ G06T 7/37; G06F 21/602
See application file for complete search history.

(56) References Cited

U.S. PATENT DOCUMENTS

| | | | | |
|---|---|---|---|---|
| 2016/0088286 | A1* | 3/2016 | Forsythe | G06T 15/20 348/46 |
| 2019/0197739 | A1* | 6/2019 | Sinharoy | G06K 9/6218 |
| 2019/0236850 | A1* | 8/2019 | Li | G09C 5/00 |
| 2020/0111237 | A1* | 4/2020 | Tourapis | G06T 9/001 |
| 2020/0205723 | A1* | 7/2020 | Massey | A61B 5/441 |
| 2020/0219288 | A1* | 7/2020 | Joshi | H04N 19/184 |
| 2020/0221125 | A1* | 7/2020 | Budagavi | H04N 19/597 |

OTHER PUBLICATIONS

Jin, Xin & Wu, Zhaoxing & Song, Chenggen & Zhang, Chunwei & Li, Xiaodong. (2016). 3D Point Cloud Encryption Through Chaotic Mapping. 9916. 119-129. 10.1007/978-3-319-48890-5_12. (Year: 2016).*

A. Jolfaei, X. Wu and V. Muthukkumarasamy, "A 3D Object Encryption Scheme Which Maintains Dimensional and Spatial Stability," in IEEE Transactions on Information Forensics and Security, vol. 10, No. 2, pp. 409-422, Feb. 2015, doi: 10.1109/TIFS.2014.2378146. (Year: 2015).*

Yang, X., & Zhang, H. (2016). Encryption of 3D point cloud object with deformed fringe. Advances in Optical Technologies, 2016 doi:http://dx.doi.org/10.1155/2016/4601462 (Year: 2016).*

* cited by examiner

*Primary Examiner* — Phi Hoang
(74) *Attorney, Agent, or Firm* — Ansari Katiraei LLP; Arman Katiraei; Sadiq Ansari

(57) ABSTRACT

A device is provided for encrypting and/or decrypting a point cloud having a plurality of data points that collectively produce a three-dimensional ("3D") image. Each data point may have a set of elements with values that define a position of the data point in 3D space and visual characteristics of the data point. Encrypting the point cloud may include deterministically a set of data point to encrypt, and deterministically changing the data point element values of the selected data points so that the 3D image produced by the encrypted data points is different than the 3D produced from the unencrypted data points. Decrypting the resulting encrypted point cloud may include deterministically reselecting the encrypted data points using an encryption key, and deterministically reversing the changes made to the data point element values of the selected data points based on transformations that are specified as part of the encryption key.

20 Claims, 13 Drawing Sheets

SYSTEMS AND METHODS FOR POINT CLOUD ENCRYPTION

BACKGROUND

A point cloud may include a set of data points for representing a three-dimensional ("3D") or volumetric object or image. The point cloud data points may differ from pixels of a two-dimensional ("2D") image. The point cloud data points may include positional and non-positional information. However, certain regions of the point cloud may have no data points, lower densities of data points, and/or higher densities of data points based on varying amounts of visual information that is detected at those regions. In contrast, pixels of a 2D image have a pre-determined uniform density and pre-determined fixed arrangement that is defined by the resolution of the 2D image. Moreover, the point cloud data points may have a non-uniform placement or positioning, whereas the 2D image has pixel data for each pixel of a defined resolution or shape (e.g., 640×480, 800×600, etc.).

FIG. 1 illustrates a point cloud example. As shown, the point cloud may include data points 110 at different regions and at different depths that capture an object shape and/or structure in a nature representative of the object. When rendered together, the point cloud data points produce a 3D image or rendering 120 of the object.

DETAILED DESCRIPTION OF PREFERRED EMBODIMENTS

Figure 1:
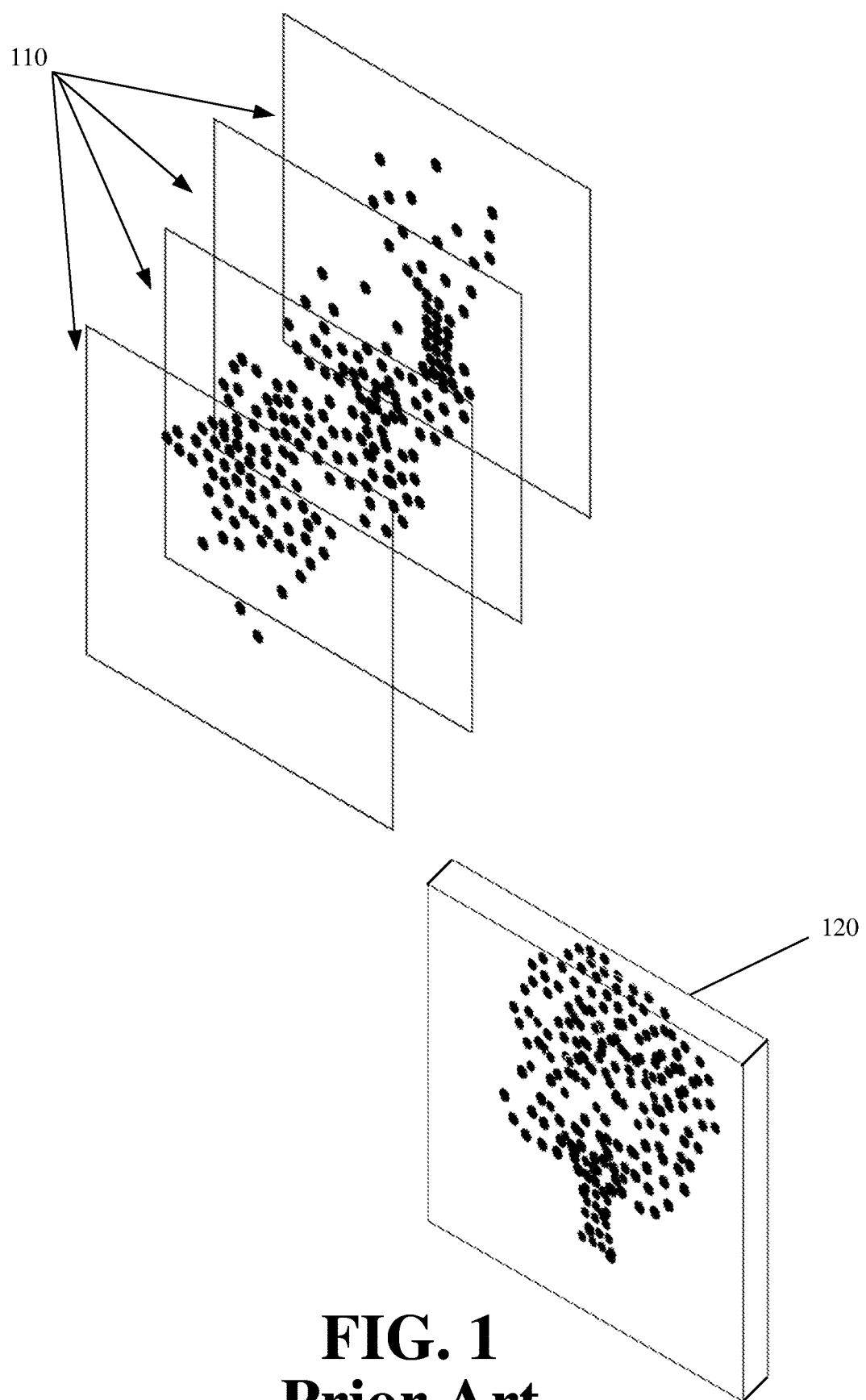
FIG. 1 illustrates a point cloud example.

The following detailed description refers to the accompanying drawings. The same reference numbers in different drawings may identify the same or similar elements.

Point clouds may store information or images that is confidential or proprietary. Without encryption, anyone that obtains a copy of a point cloud file may be able to access the information or image therein. For instance, patient medical imaging scans may be captured as one or more point clouds. These points clouds may contain confidential or regulated information that should only be accessed by authorized personnel (e.g., the patient and/or the medical practitioner for that patient). A vehicle manufacturer may expend considerable resources to generate detailed point clouds for autonomous vehicle operation. The vehicle manufacturer may want to safeguard the point cloud data from misappropriation or theft. Similarly, a graphic arts, film, movie, print, and/or another studio may create and/or store their work as point clouds, and may want to secure those works from theft even if unauthorized users gain access to the point cloud files.

Accordingly, disclosed are systems and methods for point cloud encryption. The point cloud encryption encrypts the point cloud file so that the information or images therein cannot be accessed in their original format by unauthorized devices or users that have access to the point cloud file. The encryption may include scrambling, changing, and/or otherwise modifying the point cloud data points so that any image that is rendered based on the encrypted point cloud file and/or data points of the point cloud file is distorted or unusable. In other words, the image that is rendered from the encrypted data points of a particular point cloud file may have no or a fractional number of data points in common with the image that is rendered from decrypted or unencrypted data points of the same particular point cloud file, such that the rendered images have little to no resemblance with one another. The point cloud encryption therefore prevents unauthorized users from being able to access the point cloud information despite having access to the file storing the point cloud with the encrypted data points.

The point cloud encryption may generate a key after encrypting a point cloud. The key may be used by authorized users and/or devices to decrypt the encrypted point cloud file, and to access the decrypted data points of that point cloud. Specifically, the key may be used to reverse the scrambling, changing, and/or modifying of the encrypted point cloud data points. Without the key, decryption of the point cloud may be impossible or extremely difficult.

In some embodiments, each point cloud data point may correspond to a part of an imaged object. Each point cloud data point may include positional information such as a coordinate within a three-dimensional ("3D") space. For instance, each point cloud data point may include x-coordinate, y-coordinate, and z-coordinate data point elements to represent the position of the imaged part in the 3D space.

In some embodiments, each point cloud data point may include non-positional information or data point elements. The non-positional data point elements may include information about the visual characteristics of the imaged part. The visual characteristics may correspond to a detected color. The color may be represented using red, green, and blue ("RGB") values. In some embodiments, the visual characteristics may provide the chrominance and/or luminance of the imaged part. In some other embodiments, the visual characteristics may be related to properties of the imaging device used to capture the object part at a particular data point. For instance, the visual characteristics may include a Tesla strength value to quantify the strength of the magnetic field that was used in detecting and/or imaging the object part. In some embodiments, the non-positional data elements may include energy, audible or sound, and/or other characteristics of the imaging device or the object being imaged. Accordingly, the non-positional data element can include any property of the imaged object part (e.g., hue, saturation, brightness, reflectivity, etc.) or of the imaging device used to capture the object part at a corresponding data point in 3D space.

Each point cloud data point may include an array of data point elements. The array of data point elements may provide the positioning of the data point in 3D space as well as one or more visual characteristics of that data point. For instance, a point cloud data point may be stored and/or represented as an array of data point elements with some combination of x-coordinate, y-coordinate, z-coordinate, red, green, blue, chrominance, luminance, tesla, and/or other values. The point cloud data points and the values of their corresponding data point elements may be generated by a 3D or depth-sensing camera, Light Detection and Ranging ("LiDAR"), Magnetic Resonance Imaging ("MRI") devices, Positron Emission Tomography ("PET") scanning devices, Computerized Tomography ("CT") scanning devices, time-of-flight devices, and/or other imaging equipment.

An encryption device may encrypt and/or decrypt different point clouds using one or more types of encryption. The one or more types of encryption may include applying the same encryption with different parameters that lead to scrambling, changing, and/or modifying of different point cloud data points or data point elements, and/or applying different encryptions to perform different scrambling, changing, and/or modifying of the data points. To decrypt an encrypted point cloud, the encryption device may reverse each encryption that is applied to the encrypted point cloud in the opposite order each encryption was applied to encrypt the point cloud.

Figure 2:
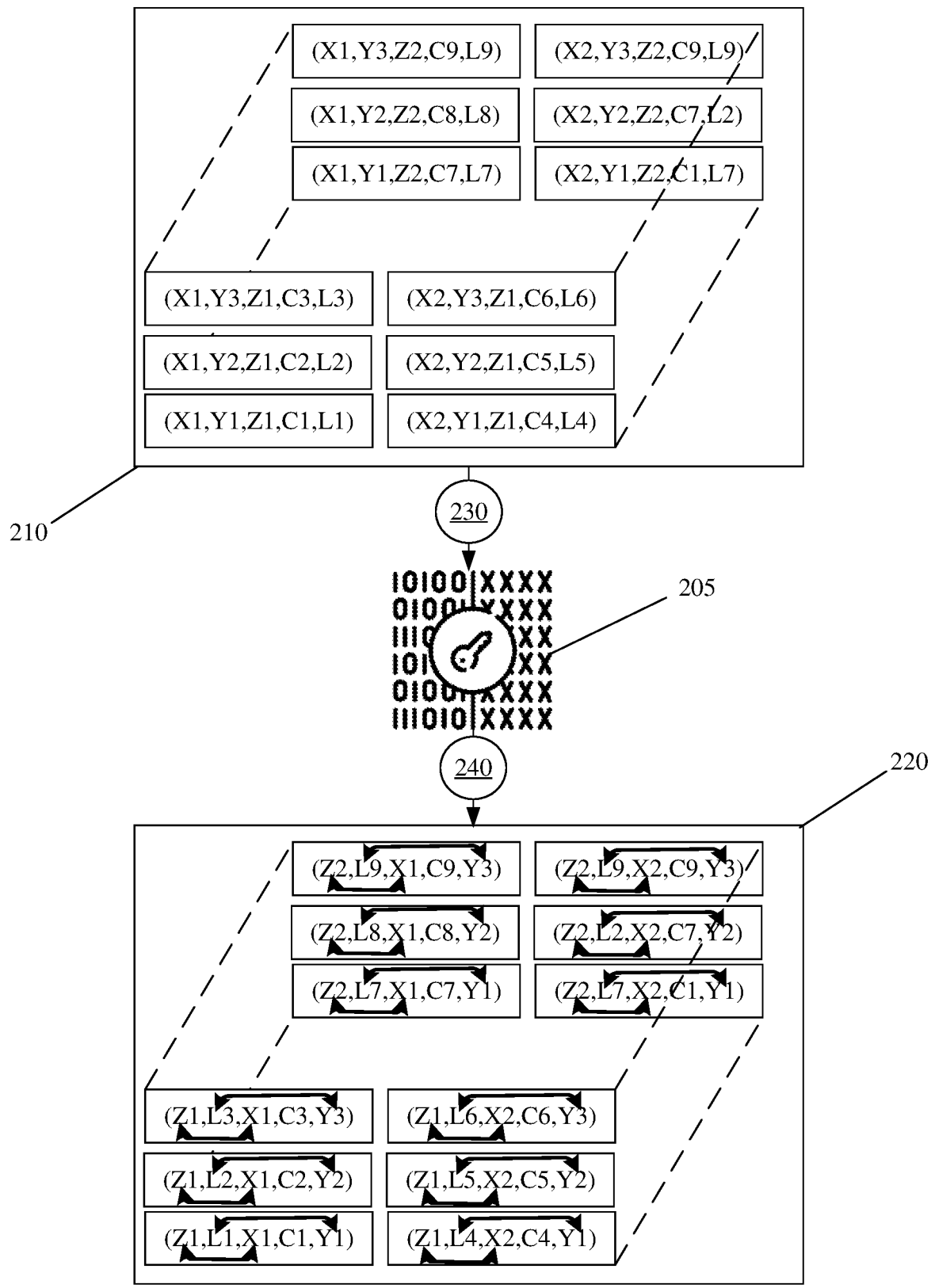
FIG. 2 illustrates an example for encrypting data points of a point cloud by scrambling elements within individual data points in accordance with some embodiments presented herein.

FIG. 2 illustrates an example for encrypting data points of a point cloud by scrambling elements within individual data points in accordance with some embodiments presented herein. FIG. 2 illustrates first set of data points 210 for an unencrypted point cloud. Each data point of the first set of data points 210 may include values for x-coordinate, y-coordinate, z-coordinate, chrominance, and luminance data point elements. The point cloud file format may store the first set of data points 210 as character data or may be encoded according to an encoding scheme. In any case, the first set of data points 210 may be directly read from the point cloud file, or may be read by any software or hardware device that supports the point cloud file format and/or encoding scheme. The software or hardware device, that supports the point cloud file format and/or encoding scheme, may generate the 3D image, that is represented by the first set of data points 210, from the point cloud file.

FIG. 2 illustrates encryption device 205 receiving (at 230) the unencrypted point cloud file and/or the unencrypted first set of data points 210, and encryption device 205 outputting encrypted second set of data points 220. Encryption device 205 may generate (at 240) the second set of data points 220 by scrambling the data point elements within each data point. As shown in FIG. 2, encryption device 205 may swap the value of the x-coordinate data point element with the value of the z-coordinate data point element of each data point, and may swap the value of the y-coordinate data point element with the value of the luminance data point element of each data point to produce (at 240) the encrypted second set of data points 220 from the unencrypted first set of data points 210. As a result, the image that results from rendering the encrypted second set of data points 220 will be completely different and unrecognizable from the image that is rendered from the unencrypted first set of data points 210.

Encryption device 205 may overwrite the first set of data points 210 of the point cloud file with the second set of data points 220 to encrypt the point cloud file. In some embodiments, encryption device 205 may write the second set of data points 220 to a new encrypted point cloud file that is stored separate from the unencrypted point cloud file.

In some embodiments, the file extension and/or the filename of the encrypted point cloud file may identify the encryption that was performed (e.g., swapping the x-coordinate data point element with the z-coordinate data point element and the y-coordinate data point element with the luminance data point element). Accordingly, when decrypting the encrypted point cloud file, encryption device 205 and/or another decryption device may determine the encryption that was performed based on the file extension and/or the filename, and may decrypt the first set of data points 210 from the second set of data points 220 by undoing the identified encryption (e.g., swap the x-coordinate data point element with the z-coordinate data point element and the y-coordinate data point element with the luminance data point element). In this case, the encrypted point cloud file can be decrypted by performing the encryption operations a second time to return the scrambled data point elements to their original locations within each data point.

In some embodiments, encryption device 205 may generate a key that identifies the encryption that was performed to produce the second set of data points 210. Encryption device 205 or another decryption device may use the key to decrypt the encrypted point cloud file and to restore the unencrypted first set of data points 210 from the second set of data points 220.

The key may be a hashed value, an encoded value, or another value that obscures the encryption that was performed from an unsupported or unsecure device. The key may be embedded with the encrypted point cloud file. For instance, encryption device 205 may store the key in the metadata, header, or body of the encrypted point cloud file. In some embodiments, the key may be stored as part of one or more point cloud data points. For instance, the key information about the encryption that was performed may be stored in the metadata of a specific data point that has a particular coordinate within the point cloud (e.g., particular positional data element values). In some such embodiments, encryption device 205 or another decryption device may receive the coordinates for the specific data point storing the encryption key from a user or other input, and may decrypt the encrypted point cloud file based on the encryption key that is extracted from the metadata or other data of the specific data point. Encryption data 205 may also encode or encrypt the encryption key when storing the key as part of one or more point cloud data points in order to prevent a user or device from scanning the data points to identify the encryption key. Alternatively, the key may be stored separate from the encrypted point cloud file in a database or a separate file.

Encryption device 205 may vary the data point scrambling to alter the encryption and/or increase or decrease the level of encryption. For example, encryption device 205 may scramble one pair of data point elements for each data point to reduce the computational overhead for encrypting or decrypting a file. As another example, encryption device 205 may deterministically select less than all of the first set of data points 210 to scramble in order to reduce the computational overhead. Scrambling half of the data points may be sufficient to obfuscate the original 3D image or object.

Encryption device 205 may vary the data point scrambling to provide different encryptions for different files so that a user device that may decrypt a first encrypted file generated by encryption device 205, may be unable to decrypt a second encrypted file generated by encryption device 205 because of the different scrambling or encryption used for each of the first encrypted file and the second encrypted files. Encryption device 205 may vary the data point scrambling for different point cloud files, for different data points within the files, based on data point element values, and/or based on external values or keys. For instance, encryption device 205 may generate and/or use a first key to swap the value of the x-coordinate data point element and the value of the z-coordinate data point element for every data point in a first point cloud file, and may generate and/or use a second key to swap the value of the y-coordinate data point element and the value of the chrominance data point element for every third data point in a second point cloud file. Accordingly, the first key cannot be used to decrypt the second point cloud file, and the second key cannot be used to decrypt the first point cloud file.

Figure 3:
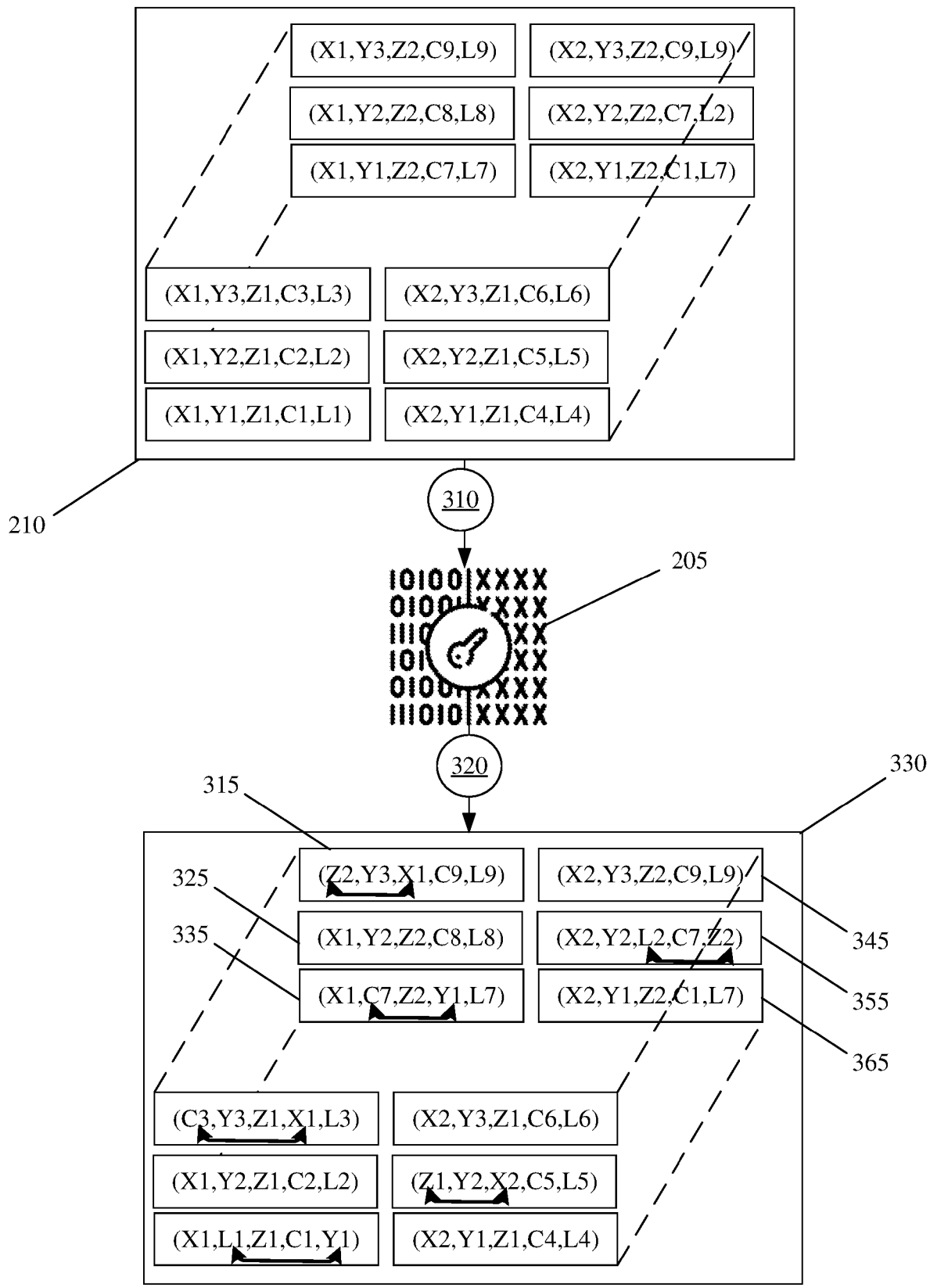
FIG. 3 illustrates an example of an encryption device increasing the level of encryption by varying the scrambling of elements within different individual data points in accordance with some embodiments presented herein.

FIG. 3 illustrates an example of encryption device 205 increasing the level of encryption by varying the scrambling of elements within different individual data points in accordance with some embodiments presented herein. Encryption device 205 may receive (at 320) the first set of data points 210 from an unencrypted point cloud file.

Encryption device 205 may use a deterministic encryption algorithm to select every other data point within the point cloud, and to perform one of three different data point modifications on a selected data point in order to generate (at 320) second set of encrypted data points 330 for an encrypted point cloud file.

As shown in FIG. 3, encryption device 205 may swap the value of the x-coordinate data point element with the value of the z-coordinate data point element to encrypt first data point 315, may leave second data point 325 unmodified, may swap the value of the y-coordinate data point element with the value of the chrominance data point element to encrypt third data point 335, may leave fourth data point 345 unmodified, may swap the value of the z-coordinate data point element with the value of the luminance data point element to encrypt fifth data point 355, may leave sixth data point 365 unmodified, and may repeat this pattern of varying data point encryption across the first set of data points 210. Consequently, the resulting encrypted point cloud file with the second set of data points 330 is different than the encrypted point cloud file of FIG. 2 with the second set of data points 220. Nevertheless, the encryption can be reversed without loss of data point information by swapping back the data point elements for the selected data points based on the deterministic algorithm specifying which data point elements are swapped for which selected data point.

In some embodiments, encryption device 205 may alter which data points are selected for encryption based on a file size, name, checksum, and/or another static identifier of the point cloud file. For instance, encryption device 205 may hash the checksum, and encryption device 205 may determine to encrypt all data points, every other data point, every third data point, etc. based on the hash result. Alternatively, encryption device 205 may select which data points to encrypt based on an encryption configuration file or encryption parameters, or based on a random number generator that generates a selector value for specifying which data points to encrypt. The selector value may be stored as part of the encryption key that is used to decrypt the encrypted point cloud.

Figure 4:
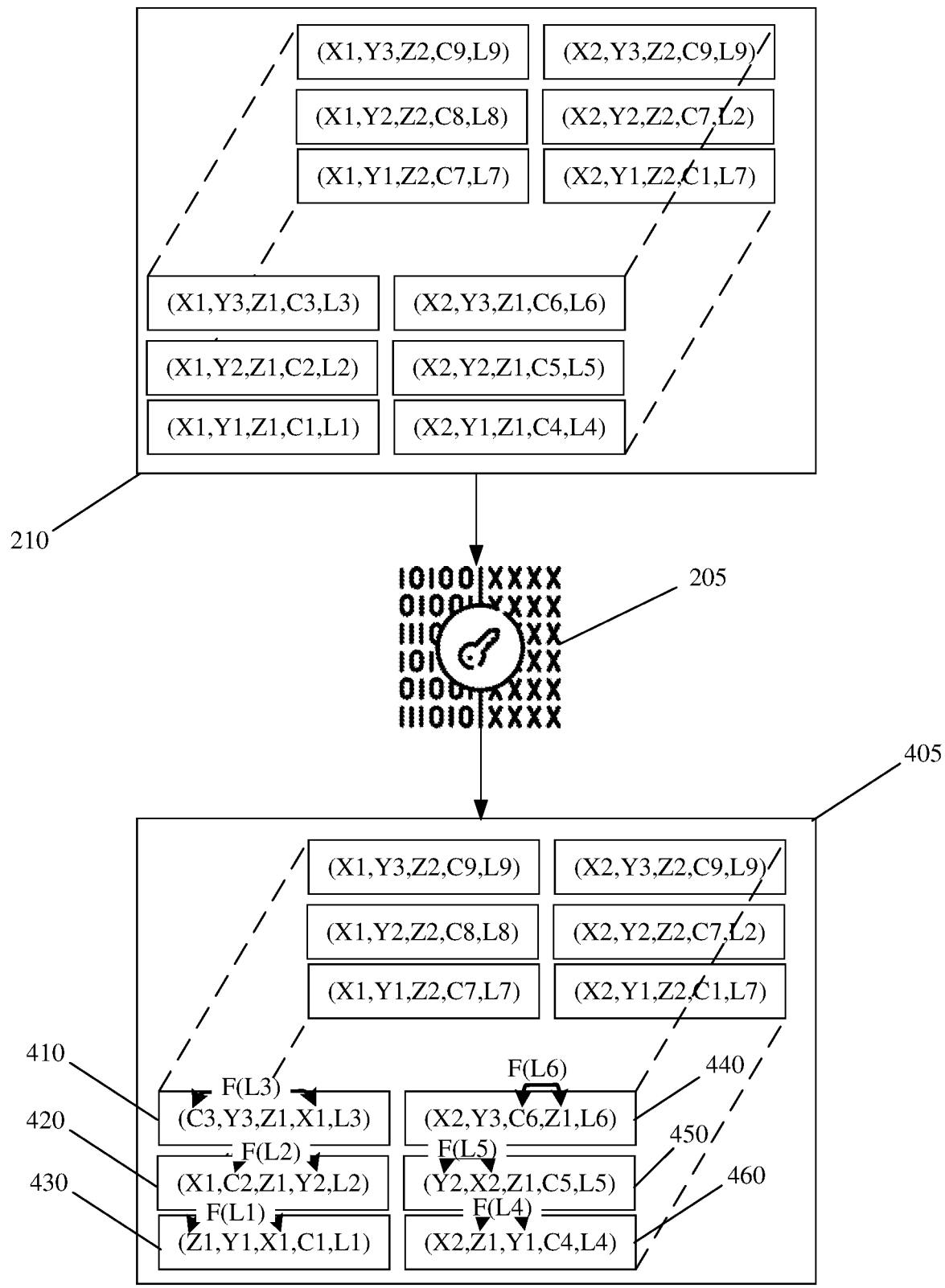
FIG. 4 illustrates an example of the encryption device dynamically encrypting different data points based on one or more values of the data point elements in accordance with some embodiments presented herein.

To further increase the level of encryption, encryption device 205 may perform a dynamic encryption of the data points, whereby the encryption and/or scrambling applied to each data point is not deterministically defined, but is rather dynamically determined based on one or more values of the data point or other data. FIG. 4 illustrates an example of encryption device 205 dynamically encrypting different data points based on one or more values of the data point elements in accordance with some embodiments presented herein.

As shown in FIG. 4, encryption device 205 may produce encrypted data points 405 by performing a different encryption for each selected data point based on different element values of the selected data point. In particular, encryption device 205 may determine which element values of a data point to swap based on the value of the luminance data point element or a function of the value of the luminance data point element. For instance, encryption device 205 may swap the x-coordinate value with the chrominance value for first data point 410 based on a first luminance value of first data point 410, may swap the y-coordinate value with the chrominance value for second data point 420 based on a second luminance value of second data point 420, may swap the x-coordinate value with the z-coordinate value for third data point 430 based on a third luminance value of third data point 430, may swap the z-coordinate value with the chrominance value for fourth data point 440 based on a fourth luminance value of fourth data point 440, may swap the x-coordinate value with the y-coordinate value for fifth data point 450 based on a fifth luminance value of fifth data point 450, and may swap the y-coordinate value with the z-coordinate value for sixth data point 460 based on a sixth luminance value of sixth data point 460.

Encryption device 205 may hash the luminance data point element value to determine which data point elements to swap and/or another encryption to apply to the data point. In some embodiments, the dynamic encryption may be based on another data point element or two or more data point elements (e.g., two or more of the x-coordinate, y-coordinate, z-coordinate, red, green, blue, chrominance, luminance, and tesla values) of the same data point, and may involve swapping one or more pairs of data point elements. In some embodiments, the dynamic encryption may involve swapping data point elements of a particular data point based on one or more preserved data point elements of one or more other data points (e.g., swap the y-coordinate value and the z-coordinate value of a first data point based on the x-coordinate value of a second data point). In any case, encryption device 205 may dynamically encrypt the point cloud data points as a result of conditioning the encryption of the data points based on one or more data point element values, or conditioning the encryption on other point cloud data. Encryption device 205 and/or another decryption device may read an encryption key to determine the function, formula, and/or other parameters by which the dynamic encryption can be reversed and the data point elements of the encrypted data points can be restored to their original values.

Figure 5:
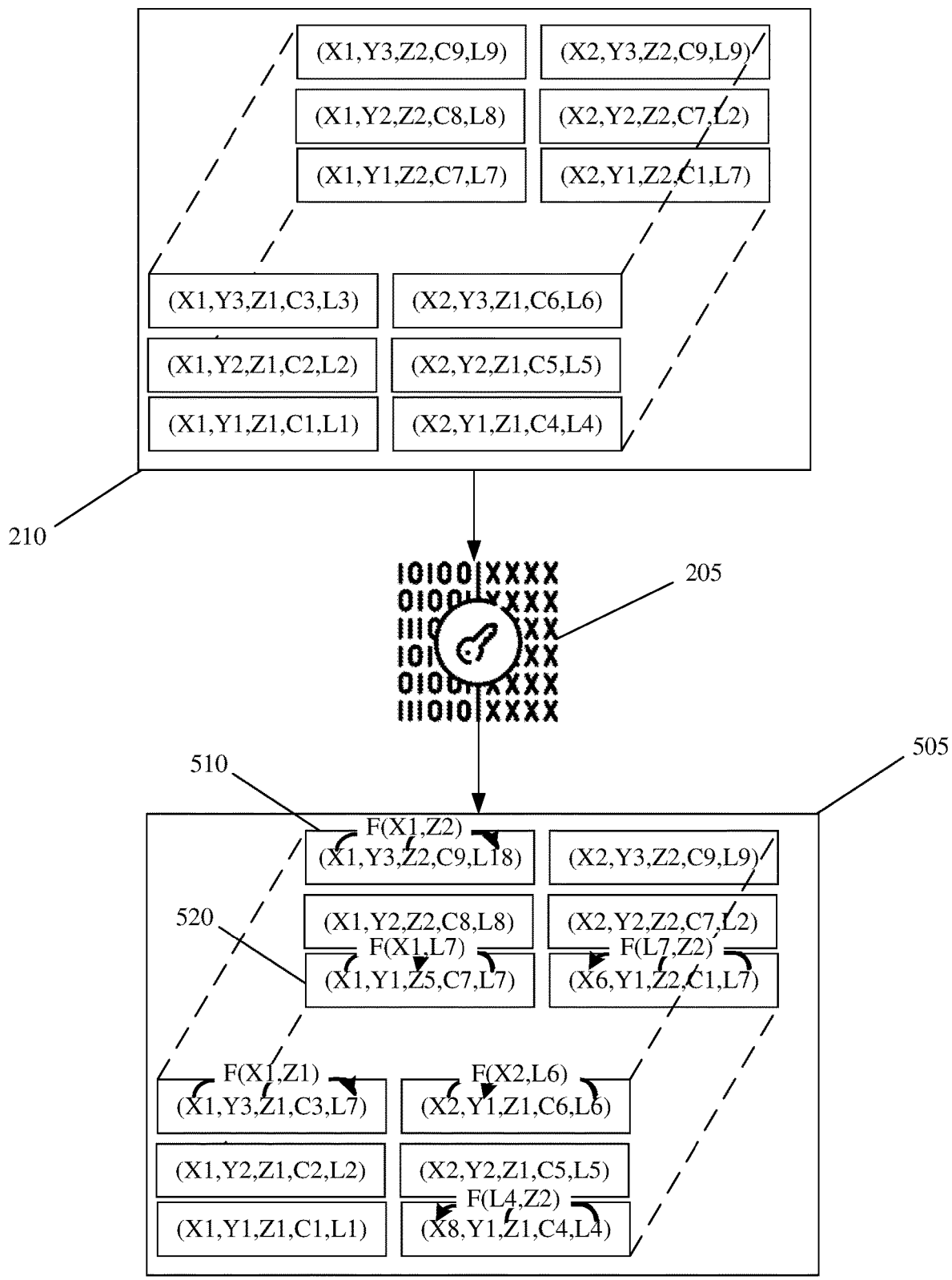
FIG. 5 illustrates an example of the encryption device dynamically encrypting different data points with modified elements based on one or more other elements of the data points in accordance with some embodiments presented herein.

Instead of swapping data point elements, the dynamic encryption may include changing or modifying values for one or more data point elements of a selected data point based on one or more other values of that selected data point or other data points. FIG. 5 illustrates an example of encryption device 205 dynamically encrypting different data points with modified values based on one or more other values of the data points in accordance with some embodiments presented herein.

Encryption device 205 may receive unencrypted first set of data points 210, and may produce encrypted second set of data points 505 by deterministically selecting different data points from the unencrypted first set of data points 210, deterministically selecting a different encryption function to apply to a selected data point, and performing a dynamic encryption based on the selected encryption function and values for one or more data point elements of the selected data point. As shown in FIG. 5, encryption device 205 may deterministically select first data point 510, may deterministically select a first encryption function for selected first data point 510, and may use the first encryption function to modify the luminance value of first data point 510 by a first amount based on the x-coordinate value and z-coordinate value of first data point 510. Encryption device 205 may also deterministically select second data point 520, may deterministically select a second encryption function for selected second data point 520, and may use the second encryption function to modify the z-coordinate value of second data point 520 by a different second amount based on the x-coordinate value and luminance value of second data point 520. Other data points of the second set of data points 505 are encrypted using different encryption algorithms that use different combinations of data point elements to specify the amount with which to modify other data point elements of the data point being encrypted.

The encrypted point cloud file extension, filename, metadata, header, key, and/or other data (e.g., data point metadata) may encode the encryption that was performed including the algorithms and/or parameters that were used to select data points for encryption, and that were used to determine which data point elements to swap, change, or otherwise encrypt. Encryption device 205 or another decryption device may reference the file extension, filename, metadata, header, key, and/or other data in order to decrypt the encrypted data points, and to restore the data point values for rendering the original point cloud image.

In some embodiments, encryption device 205 may perform a batch encryption of data points to obfuscate and distort data points of a point cloud. The batch encryption may include applying different transformations to different sets of data points, rather than modifying each data point individually.

Figure 6:
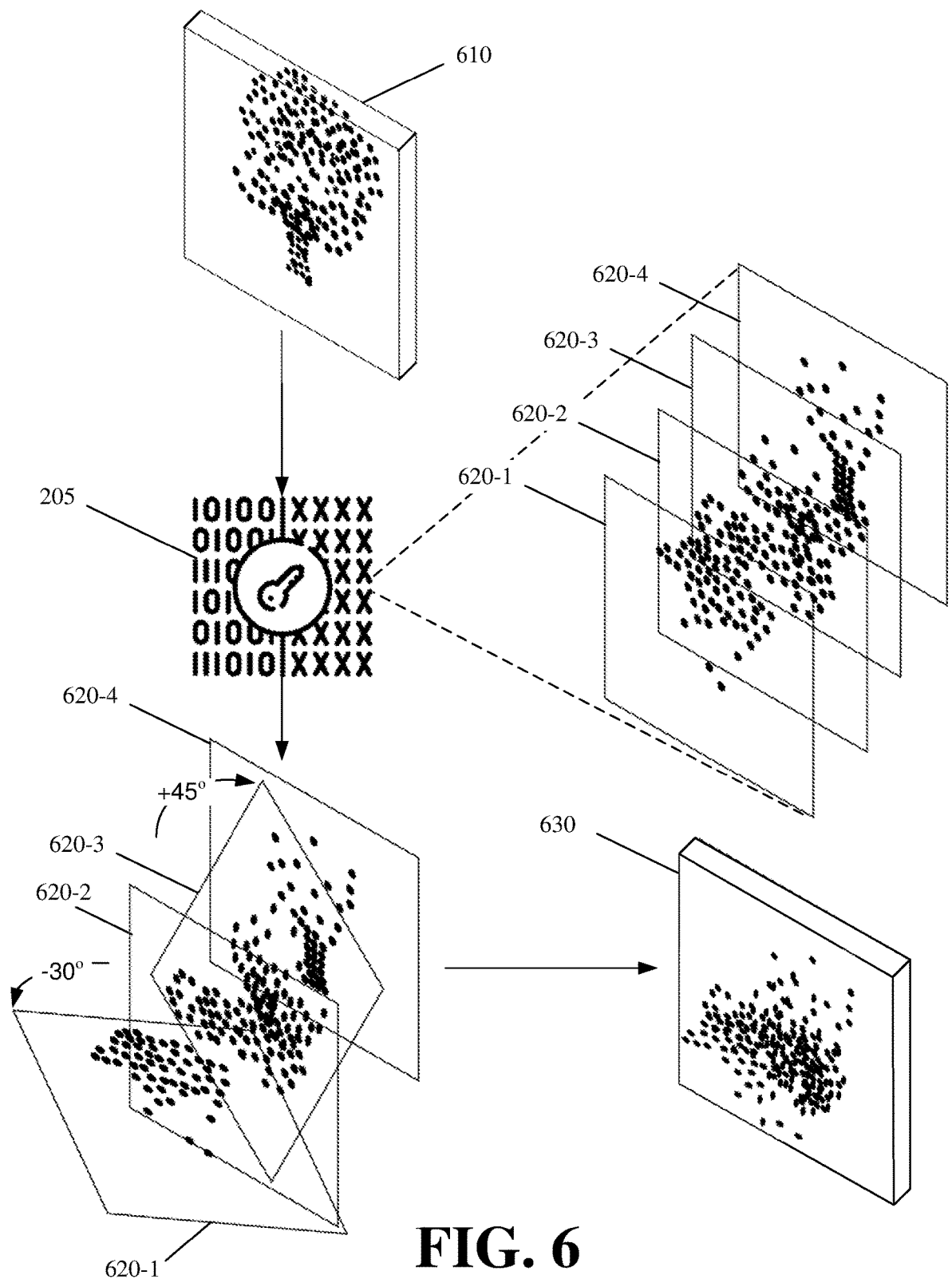
FIG. 6 illustrates a batch encryption example whereby different rotations are applied to different sets of data points in order to encrypt a point cloud in accordance with some embodiments presented herein.

FIG. 6 illustrates a batch encryption example whereby different rotations are applied to different sets of data points in order to encrypt a point cloud in accordance with some embodiments presented herein. Encryption device 205 may receive unencrypted point cloud 610. Encryption device 205 may partition point cloud 610 into different slices 620-1, 620-2, 620-3, and 620-4 (sometimes collectively referred to as "slices 620" or individually as "slice 620").

Each slice 620 may correspond to a different and/or mutually exclusive set of data points from point cloud 610. The partitioning of point cloud 610 into slices 620 or the selection of the set of data points for each slice 620 may be determined algorithmically or based on the encryption that is applied to that point cloud 610.

In some embodiments, slices 620 may be defined to include different data points based on the values of one or more data point data elements. For instance, each slice 620 may include the data points on a particular coordinate plane (e.g., data points having one or more of a common x-coordinate value, y-coordinate value, or z-coordinate value). In FIG. 6, encryption device 205 may partition point cloud 610 so that each slice 620 includes the data points with a common z-coordinate value.

In some embodiments, slices 620 may be defined to include different data points that are selected based on one or more reference data points in unencrypted point cloud 610 and/or one or more positions within or around unencrypted point cloud 610. For example, slices 620 may be defined based on a particular internal data point of unencrypted point cloud 610, and may include data points falling within different vectors and/or projections that originate from the particular internal data point. As another example, slices 620 may include data points that fall within different volumes, cubes, cylinders, planes, or other projections from a selected position inside or around unencrypted point cloud 610, and wherein the selected position need not correspond to a data point of unencrypted point cloud 610. As yet another example, first slice 620-1 may be defined to include a first set of data points that fall within a first projection from a first position (e.g., data points falling within a cone originating in a particular direction from the first position), and second slice 620-2 may be defined to include a second set of data points that fall within a different second projection from a different second position (e.g., data points falling within a cube that is centered about the second position). In other words, slices 620 can be defined from different views of unencrypted point cloud 610 and/or different reference points.

Encryption device 205 may perform different rotations for one or more of slices 620. Encryption device 205 may perform a rotation by increasing or decreasing one or more data point elements for all data points in a particular slice 620 by the same amount or according to a formula. In some embodiments, the data points in slice 620 may be represented in a matrix, and a matrix transformation may be performed to produce the rotation. As shown in FIG. 6, encryption device 205 may produce encrypted point cloud 630 by rotating data points within first slice 620-1 along the x-axis or x-coordinate plane by negative 30 degrees and/or by rotating data points within third slice 620-3 along the x-axis or x-coordinate plane by 45 degrees. As a result of the rotations, encrypted point cloud 630 obfuscates and distorts the image of unencrypted point cloud 610.

Encryption device 205 may adjust the data points of each slice or may adjust the data points of a deterministically selected subset of slices. Encryption device 205 may adjust one or more data point elements for each encrypted slice differently using a deterministic formula that specifies the adjustment amount for each adjusted data point element of each slice. For instance, the formula may specify multiplying the x-coordinate value of each data point in a first slice by a first number, increasing the chrominance of each data point in the first slice by a second number, multiplying the x-coordinate value of each data point in a second slice by a third number, and increasing the chrominance of each data point in the second slice by a fourth number. The deterministic formula may also adjust the data points by skewing, compressing (e.g., reducing radial distance between the data points and/or eliminating a data point based on values of neighboring data points), expanding (e.g., increasing the radial distance between the data points and/or creating false data points based on values of neighboring data points), and/or otherwise changing one or more data point elements of the data points.

In some embodiments, slices 620 may include data points from different frames of a video or stream. In some such embodiments, each frame may include data points for representing a 2D or 3D image, or transformations to a 2D or 3D object. Accordingly, the encryption applied to each slice 620 in FIG. 6 may also be used to perform different encryptions to different frames of a video or different frames representing an object. For instance, each next frame of the video may be encrypted using a different encryption than was used to encrypt the previous frame. Alternatively, the different encryptions may be applied to different groups of frames (e.g., every third frame, every odd frame, etc.) In some embodiments, the encryption performed for a first frame or first point cloud may determine a next or different encryption to apply to a next or second frame or second point cloud.

Figure 7:
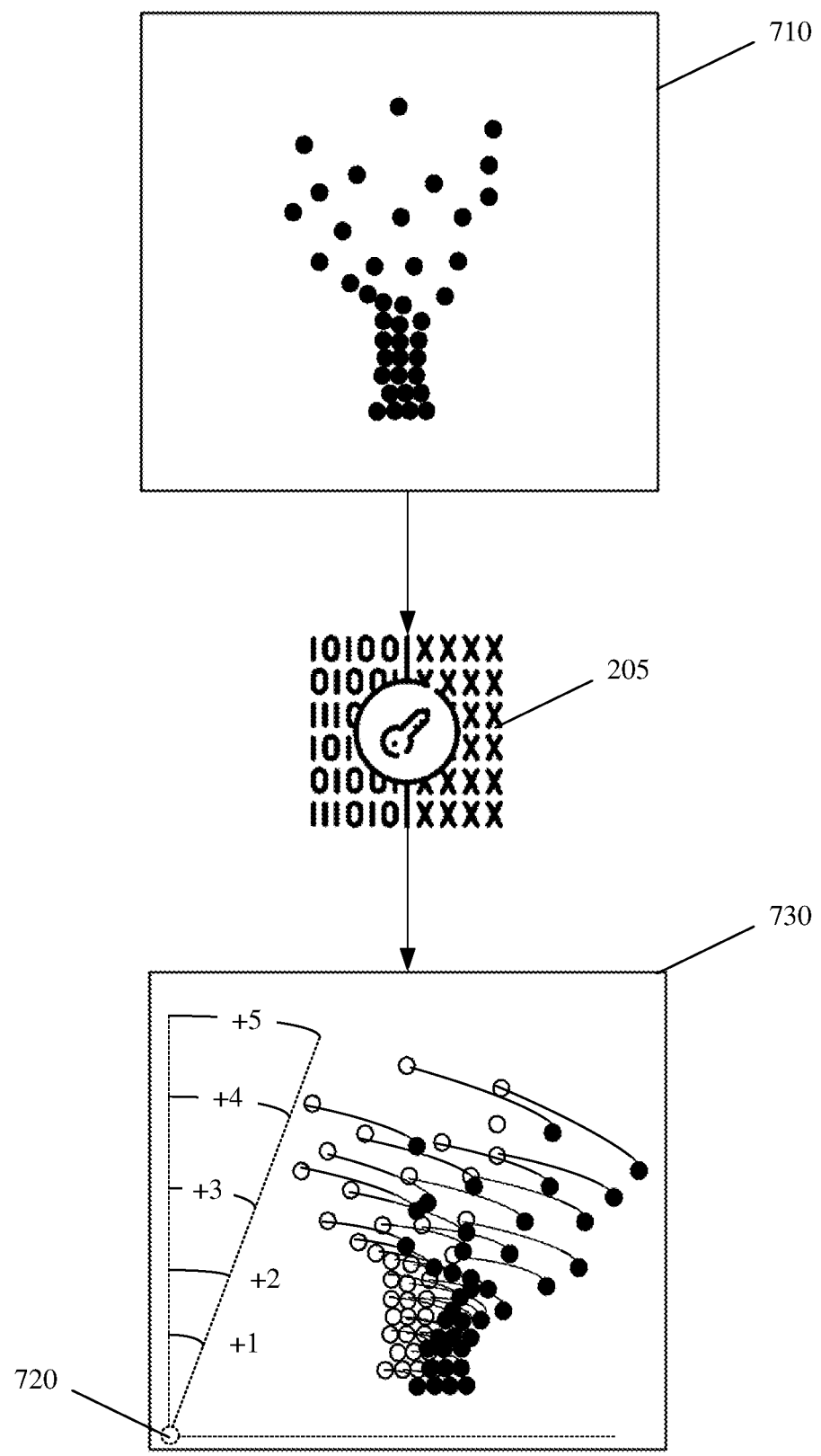
FIG. 7 illustrates an example of the encryption device performing a varying encryption of point cloud data points in accordance with some embodiments presented herein.

FIG. 7 illustrates an example of encryption device 205 performing a varying encryption of point cloud data points in accordance with some embodiments presented herein. Encryption device 205 may receive a slice or an entire point cloud 710 for encryption. Encryption device 205 may encrypt the data points by adjusting, rotating, and/or radially shifting data points of the slice or point cloud 710 that are closest to starting point 720 less than data points that are further from starting point 720. The encrypted data points are stored as part of encrypted point cloud 730.

In some embodiments, encryption device 205 may determine the varying amount with which to adjust a data point based on the distance between that data point and starting point 720. In some embodiments, encryption device 205 may determine the varying amount with which to adjust a data point based on the angle separating that data point from starting point 720.

The adjustments can include changing values for one or more data point elements of data points. For instance, the adjustments may include rotating the data points by changing x-coordinate and y-coordinate values of the data points by varying amounts.

Encryption device 205 may perform different varying adjustments to different slices of the point cloud (e.g., data points with different z-coordinate values) to further scramble point cloud 710 and/or increase the number of distinct transformations that are needed to decrypt resulting encrypted point cloud 730. For instance, encryption device 205 may encrypt data points in a first slice by adjusting those data points based on their distance from starting point 720 and a first value (e.g., a first multiplier), and may encrypt data points in a second slice by adjusting those data points based on their distance from starting point 720 and a different second value.

In any case, the varying encryption that is applied to unencrypted point cloud 710 may create a varying distortion across the rendered image of encrypted point cloud 730 that partially or fully obscures the original image of the unencrypted point cloud 710. The encryption is, however, lossless, and the original values for data points of point cloud 710 can be restored from the adjusted values of the encrypted data points of encrypted point cloud 730 by reversing the adjustments.

Encryption device 205 may select any data point of point cloud 710 or any point within an acceptable range of values (e.g., any point within the minimum and maximum of x-coordinate, y-coordinate, and z-coordinate values of point cloud 710) as starting point 720. Accordingly, starting point 720 may be a point or position that is different from any data point of unencrypted point cloud 710 and/or may include any position outside, around, or inside unencrypted point cloud 710 from which the adjustments and/or encryptions to the point cloud data points may be computed or determined.

Starting point 720 and/or the method for computing the varying adjustments may be stored as part of the encryption key that may be used to decrypt encrypted point cloud 730. The encryption key may be a file or data structure that is stored separate from encrypted point cloud 730 file, or may be encoded within the file header, metadata, file extension, filename, and/or other data of the encrypted point cloud 730 file.

In any case, encryption device 205 and/or another decryption device may receive the file for encrypted point cloud 730 and the encryption key. Using the encryption key, encryption device may determine where to set starting point 720 within encrypted point cloud 730, and may determine a varying amount of adjustment to apply to the encrypted data points in order to restore them to their original values so that the original image of unencrypted point cloud 710 can be accessed.

Encryption device 205 may perform other varying encryptions that produce a non-static or dynamic adjustment to the data points. In some embodiments, encryption device 205 may adjust the data points of each slice dynamically based on values for one or more data point elements of the data points in the slice. For instance, encryption device 205 may sum, average, hash, and/or perform another calculation of the y-coordinate values and/or z-coordinate values for the data points having a particular z-coordinate value, and may determine the degree of rotation along the x-axis or the amount by which to adjust the x-coordinate value of each data point based on the y-coordinate value calculation and/or z-coordinate value calculation. The rotations may adjust the x-coordinate values, but preserve the y-coordinate values and/or z-coordinate values by which encryption device 205 may decrypt the data points by undoing the rotations and/or x-coordinate value adjustments.

In some embodiments, encryption device 205 may perform multiple rotations along different axes to increase the level of encryption for the resulting encrypted point cloud. For instance, encryption device 205 may partition data points of an unencrypted point cloud along a first axis (e.g., x-axis), may rotate or adjust each particular slice by a different amount along a second axis (e.g., y-axis) based on the first axis values of the data points in that particular slice, and may rotate or adjust each particular slice by a different amount along a third axis (e.g., z-axis) based on the first axis values of the data point elements in that particular slice, thereby producing an encrypted point cloud.

Since the first axis values of the data points are preserved in the encrypted point cloud, encryption device 205 may decrypt the encrypted point cloud by first reversing the different rotations or adjustments to each particular slice along the third axis based on the first axis values of the data points in that particular slice, and then reversing the different rotations or adjustments to each particular slice along the second axis based on the first axis values of the data points in that particular slice.

The sequence of rotations and formulas used to determine the amount of adjustment may be encoded within the encrypted point cloud file extension, filename, header, metadata, key, and/or other data or files. For instance, a key value of "10ACVA312" may map to an encryption whereby each slice in a point cloud is rotated about the x-axis using a first starting value that increases linearly for each next slice, and is then rotated about the y-axis using a second starting value that increases by a fixed third value for each next slice.

To increase the level of encryption, encryption device 205 may select slices based on two or more parameters, thus making identification of the encrypted data points more difficult. For instance, a first slice may include all data points of a point cloud with a particular z-coordinate value and with a y-coordinate value that is greater than a first value, and a second slice may include all data points of a point cloud with the same particular z-coordinate value and with a y-coordinate value that is less than a second value. Accordingly, there can be multiple slices within the same coordinate plane, and encryption device 205 may implement different adjustments to these slices so that the data points within the same coordinate plane are encrypted differently. Similarly, encryption device 205 may include different sets of data points within different slices based on deterministic equations, volumetric shapes, and/or projections from any data point or position within, around, or outside the point cloud subject to encryption.

Figure 8:
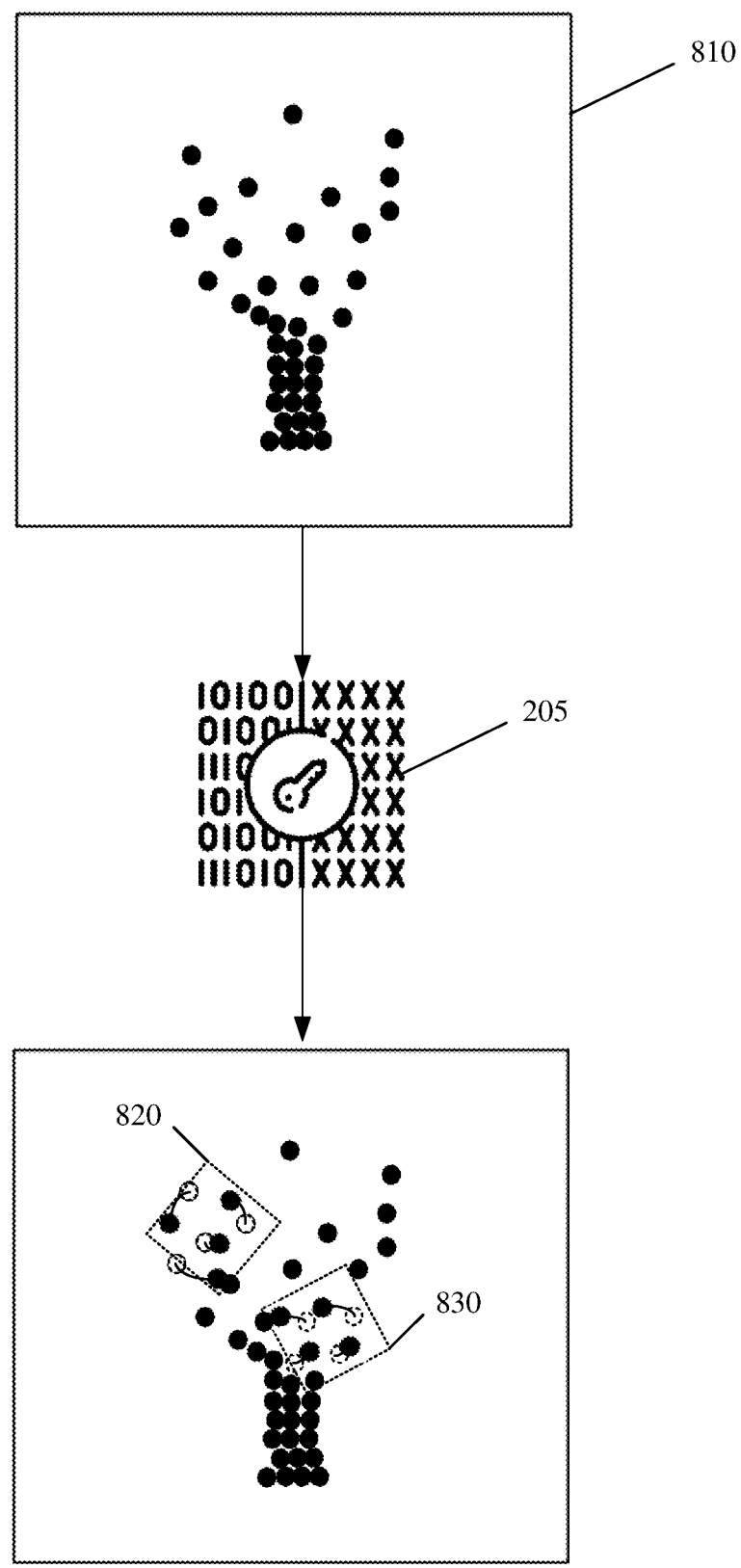
FIG. 8 illustrates an example of batch encrypting slices of data points that are defined based on two or more parameters in accordance with some embodiments presented herein.

FIG. 8 illustrates an example of batch encrypting slices of data points that are defined based on two or more parameters in accordance with some embodiments presented herein. As shown in FIG. 8, encryption device 205 may receive point cloud 810. Point cloud 810 may include a plurality of data points in 3D space.

Encryption device 205 may select first slice 820 corresponding to a first set of data points in an upper left region of point cloud 810, and second slice 830 corresponding to a second set of data points in a center right region of point cloud 810. Encryption device 205 may select first slice 820 and 830 using an algorithm and/or values from two or more data point elements associated with the data points. For instance, the first set of data points of first slice 820 may include data points of point cloud 810 that have a particular z-coordinate value, have an x-coordinate value that is less than a first value, and have a y-coordinate value that is greater than a second value. The second set of data points of second slice 830 may include data points of point cloud 810 that have the particular z-coordinate value, have an x-coordinate value that is greater than the first value, and have a y-coordinate value within a bounded range.

Encryption device 205 may perform a first adjustment to first slice 820 and a different second adjustment to second slice 830 in order to encrypt the first set of data points of first slice 820 differently than the second set of data points of second slice 830. The first adjustment and the second adjustment may include different rotations of the first set of data points and the second set of data points. Moreover, the first adjustment and the second adjustment may be performed in a manner that allows encryption device 205 to reselect the first set of data points and the second set of data points from the encrypted point cloud for decryption. Encryption device 205 may also adjust the luminance or chrominance values of the first set of data points and the second set of data points so that the adjusted data points can be differentiated from the non-adjusted data points of the encrypted point cloud.

In some embodiments, the slices may include 3D groupings of data points that are selected for encryption. For instance, a slice may be defined as a cube with data points that are within a range of x-coordinate values, y-coordinate values, and/or z-coordinate values.

Figure 9:
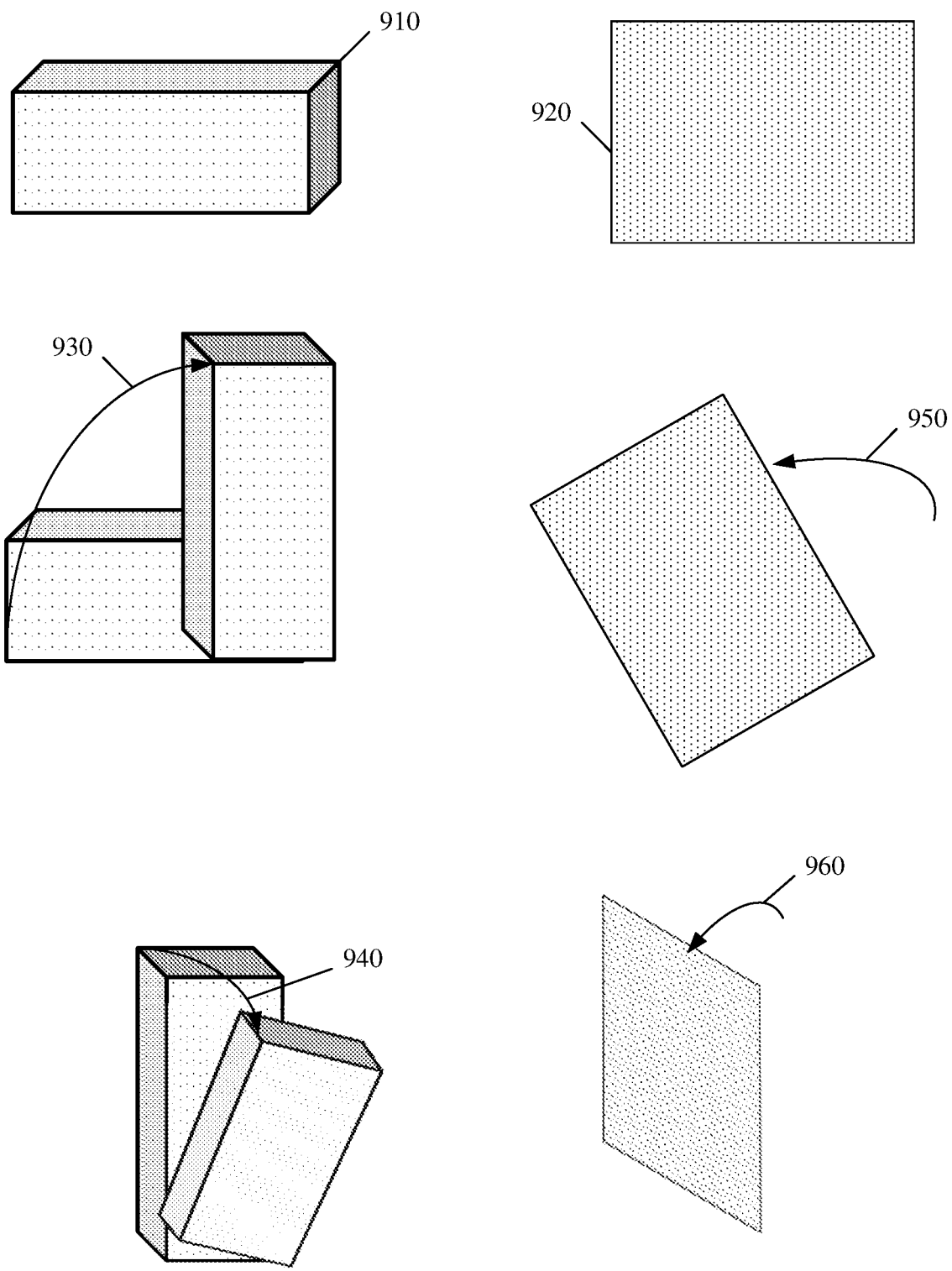
FIG. 9 illustrates an example of the encryption device encrypting a point cloud by performing two different transformations on different slices in accordance with some embodiments presented herein.

Encryption device 205 may increase the level of encryption by performing multiple transformations on the data points of a 2D or 3D slice. FIG. 9 illustrates an example of encryption device 205 encrypting a point cloud by performing two different transformations on different slices in accordance with some embodiments presented herein.

FIG. 9 illustrates first slice 910 as a cube that includes a set of data points within a range of x-coordinate values, y-coordinate values, and z-coordinate values of a point cloud, and second slice 920 as a 2D plane that includes a set of data points within a range of x-coordinate values and y-coordinate values of a point cloud. First transformation 930 of first slice 910 may include adjusting values for a first coordinate (e.g., a first data point element) by a first amount, and second transformation 940 of first slice 910 may include adjusting values for a second coordinate (e.g., a second data point element) by a second amount. Similarly, first transformation 950 of second slice 910 may include adjusting values along a first coordinate by a third amount, and second transformation 960 of second slice 920 may include adjusting values along a second coordinate by a fourth amount. The different transformations 930, 940, 950, and 960 encrypt the respective point clouds by distorting or rearranging the portion of the point cloud image that is represented by the set of data points of first slice 910 and/or second slice 920.

In some embodiments, encryption device 205 may tag or otherwise differentiate the data points that have been encrypted from the other data points, that have not been adjusted or encrypted, so that the encrypted data points may be later decrypted to restore the original point cloud image. Alternatively, the selection of the slices and the transformations that are applied to those slices may be implemented in a manner whereby encryption device 205 can reselect the data points after the transformations for decryption without affecting other data points of the point cloud. For instance, the data points of first slice 910 may correspond to topmost rows of data points in a point cloud. Accordingly, the first transformation and the second transformation that are applied to the data points may adjust the data point values without causing those data points to become interspersed with data points outside of first slice 910. The encryption key may then be used to select the encrypted data points of first slice 910, and may specify adjustments to reverse the second transformation and then the first transformation in order to restore the data points to their original values.

Figure 10:
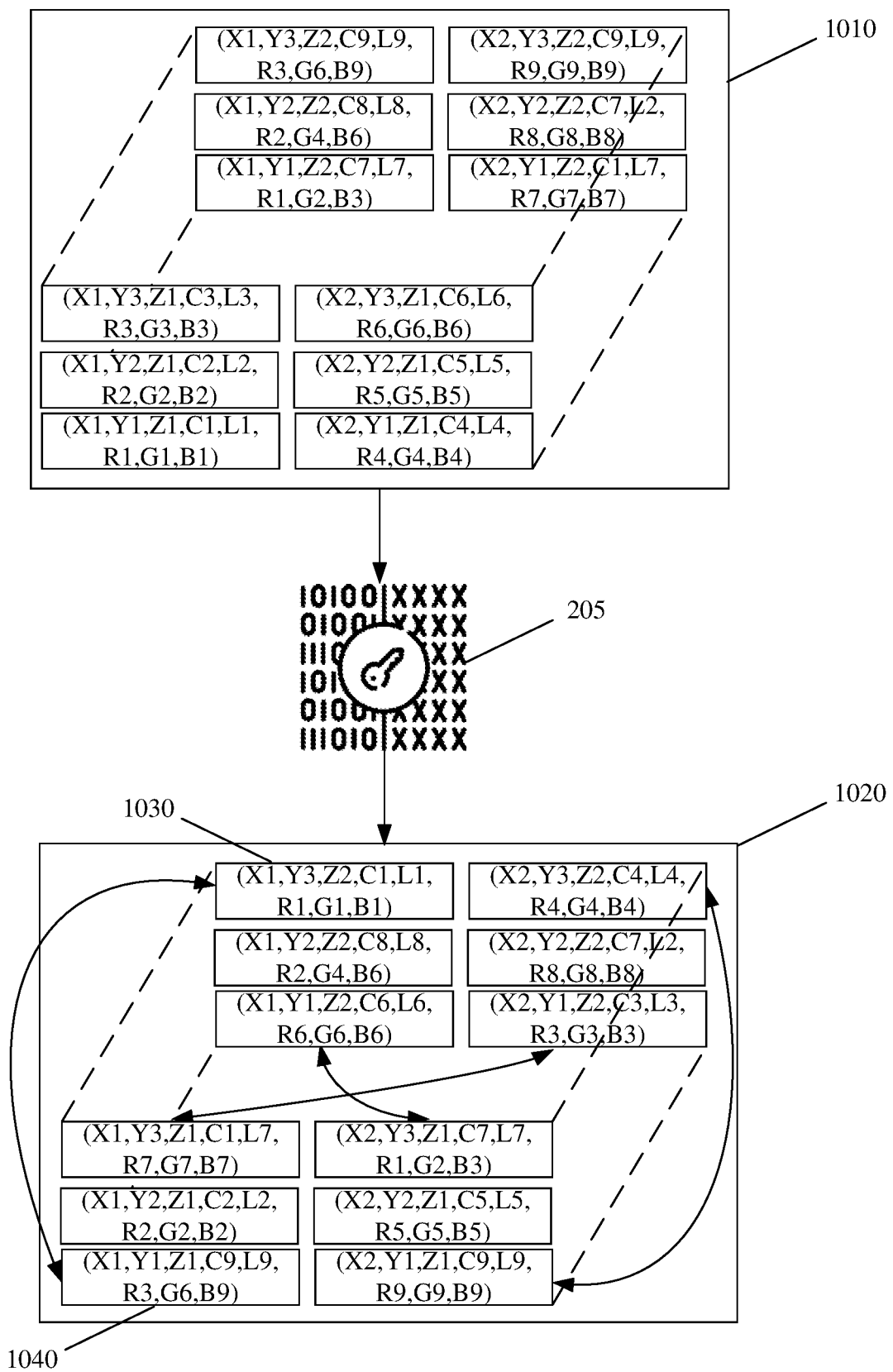
FIG. 10 illustrates an example of the encryption device encrypting a point cloud by swapping data point elements between linked pairs of data points in accordance with some embodiments presented herein.

In some embodiments, encryption device 205 may be configured to deterministically select and swap data points within a point cloud in order to encrypt that point cloud. The swapping of data points may include swapping non-positional data point elements between different pairs of data points in the point cloud. FIG. 10 illustrates an example of encryption device 205 encrypting a point cloud by swapping data point elements between linked pairs of data points in accordance with some embodiments presented herein.

As shown in FIG. 10, encryption device 205 may receive unencrypted point cloud 1010. The data points of point cloud 1010 may include positional data point elements (e.g., x-coordinate, y-coordinate, and z-coordinate values) and non-positional data point elements. The non-positional data point elements may correspond to the coloring, lighting, reflectivity, and/or other visual characteristics of the data points. For instance, data points of point cloud 1010 may include non-positional data point elements for the chrominance ("C"), luminance ("L"), red ("R"), green ("G"), and blue ("B") visual characteristics.

Encryption device 205 may produce encrypted point cloud 1020 by deterministically selecting different pairs of data points from unencrypted point cloud 1010, and by swapping the non-positional data point elements between each pair of data points. For instance, encryption device 205 may write the C, L, R, G, and B data point elements of data point 1030 in unencrypted point cloud 1010 into the C, L, R, G, and B data point elements of data point 1040 in encrypted point cloud 1020, and may write the C, L, R, G, and B data point elements of data point 1040 in unencrypted point cloud 1010 into the C, L, R, G, and B data point elements of data point 1030 in encrypted point cloud 1020.

Encrypted point cloud 1020 may retain the 3D structure or shape of unencrypted point cloud 1010. However, the lighting, coloring, reflectivity, and/or other visual characteristics will be distorted such that encrypted point cloud 1020 could not be used as a substitute for unencrypted point cloud 1010 or to reproduce the image of unencrypted point cloud 1010. In other words, rendering encrypted point cloud 1020 will yield a different image than rendering unencrypted point cloud 1010.

Encryption device 205 may generate an encryption key to identify the pairs of data points with exchanged data point elements. The encryption key may be generated through a pair-wise listing of the positional data point elements for the linked data points, and/or a hash of the pair-wise listing. For instance, the encryption key for encrypted point cloud 1020 of FIG. 10 may provide an encoded listing for data point pairs 1030 and 1040 by specifying the positional information (e.g., X1,Y3,Z2,X1,Y1, and Z1) of these data points 1030 and 1040, and may further provide an encoded value that specifies swamping each of the C, L, R, G, and B data point elements between data points 1030 and 1040. The encryption key may alternatively specify a formula for deterministically selecting the same pairs of data points in encrypted point cloud 1020 and unencrypted point cloud 1010. Accordingly, encryption device 205 and/or another decryption device may use the encryption key to identify the pairs of data point elements with swapped non-positional data point elements, and may decrypt encrypted point cloud 1020 back to the original data point data point elements of unencrypted point cloud 1010 by swapping the data point elements between the same pairs of data points.

Encryption device 205 may increase the level of encryption of an encrypted point cloud by chaining together and/or implementing two or more of the above described encryptions. For instance, decryption of an encrypted point cloud can be made more difficult by performing two or more of the intra-data point element swapping of FIGS. 2 and 3, the function-based dynamic swapping of data point elements of FIG. 4, the dynamic changing of data point elements of FIG. 5, the batch encryption of data points of FIGS. 6 and 8, the varying encryptions of FIG. 7, the combinational encryption of FIG. 9, the pairwise data point element swapping of FIG. 10, and/or other support encryption techniques. As a specific example, encryption device 205 may first perform the pairwise data point element swapping of FIG. 10 to perform an initial encryption of the data points for a particular point cloud, and may then perform intra-data point element swapping of FIG. 2 to further encrypt the data points. In this example, the resulting encrypted point cloud may have data points with swapped data point elements and the same data points may have the swapped data point elements scrambled.

Encryption device 205 may perform any number of these different encryptions in any order to generate an encrypted point cloud, and may decrypt the encrypted point cloud by performing or reversing the encryptions in reverse of the order they were performed to generate the encrypted point cloud. Encryption device 205 may identify the encryptions that were performed and the order the encryptions were performed to generate an encrypted point cloud in a multi-stage encryption key.

Moreover, encryption device 205 may apply different encryptions or the same encryptions in different orders to different point clouds that are part of the same file. For instance, the encryptions may be chained in a different order to perform a different multi-stage encryption for each frame of a video, wherein each frame may be represented as a different point cloud or different plurality of data points.

Encryption device 205 may generate the multi-stage encryption key as each encryption is performed to a particular point cloud. For instance, encryption device 205 may provide an identifier for each encryption. The identifier may identify one or more of the encryption that was performed, a deterministic selection of data points to which the encryption was applied, a formula for identifying the data points to which the encryption was applied, a formula or deterministic algorithm for adjusting data point element values of the selected data points, parameters associated with the data point element modification, and/or parameters, formulas, or algorithms associated with that encryption. Encryption device 205 may hash each identifier, or may combine the identifiers before hashing them. In some embodiments, encryption device 205 may encode the identifiers so that they are not in a human-readable format, or may encode the identifiers with codes that map to the information represented by the identifier. The encoded identifiers may be deciphered or mapped by encryption device 205 and/or another supported decryption device. The multi-stage encryption key may be stored separate from the encrypted point cloud file, or may be encoded as part of the encrypted point cloud file extension, filename, header, metadata, and/or other data.

Figure 11:
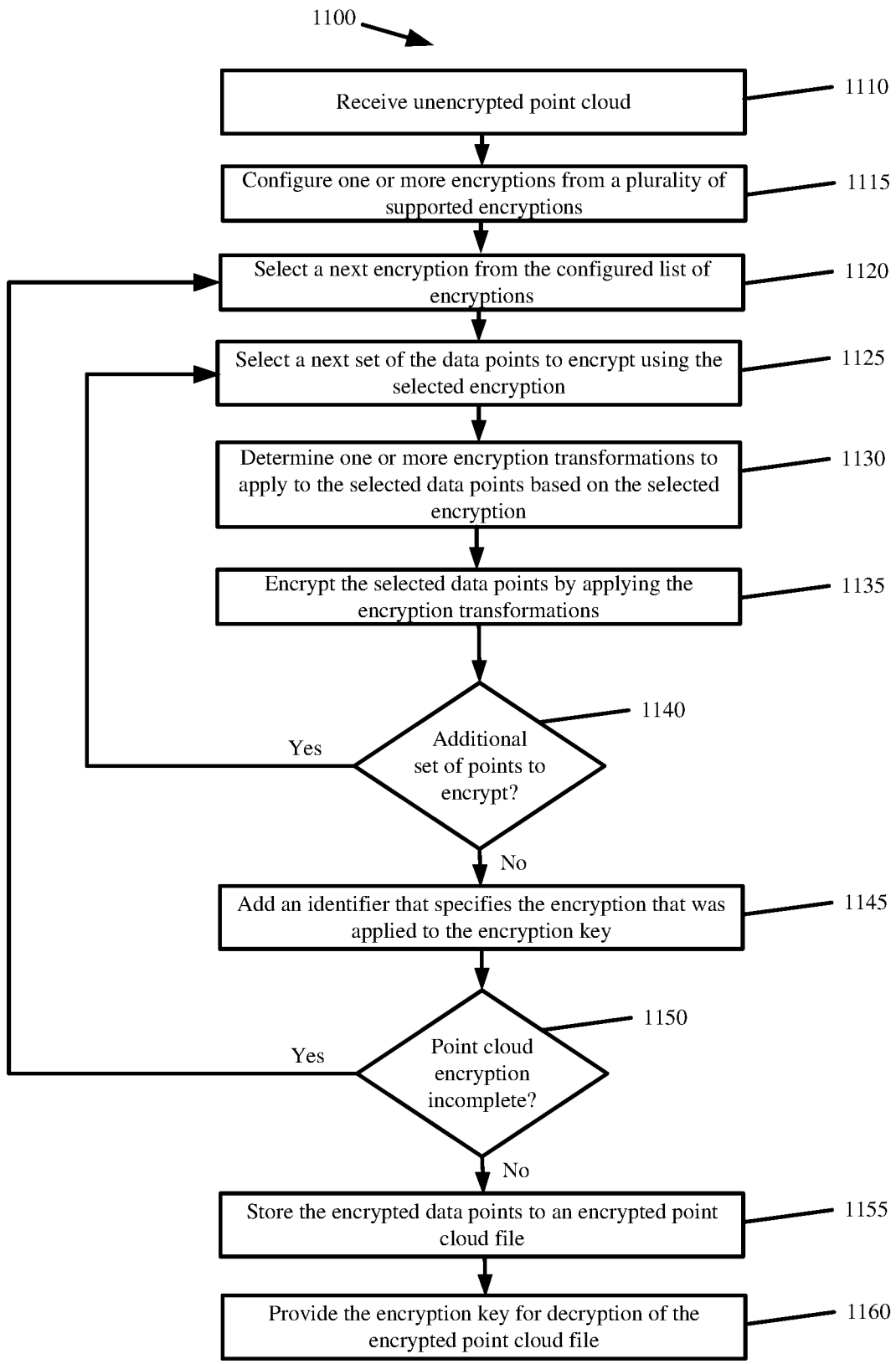
FIG. 11 presents a process for generating an encrypted point cloud with a multi-stage encryption in accordance with some embodiments presented herein.

FIG. 11 presents a process 1100 for generating an encrypted point cloud with a multi-stage encryption in accordance with some embodiments presented herein. Process 1100 may be implemented by encryption device 205.

Process 1100 may include receiving (at 1110) an unencrypted point cloud. For instance, encryption device 205 may receive a file with a plurality of data points that can be rendered to produce a 3D structure or shape of an object based on positional and non-positional data point elements of each data point.

Process 1100 may include configuring (at 1115) one or more encryptions from a plurality of supported encryptions to apply to the unencrypted point cloud. Configuring (at 1115) the one or more encryptions may include specifying which data points are subject to the encryption, and/or parameters that specify how the selected encryption is used in scrambling, changing, or otherwise modifying the selected data points. Encryption device 205 may configure (at 1115) the one or more encryptions in response to a user selecting the one or more encryptions or specifying a desired level of encryption. A lower level of encryption may produce less distortion or obfuscation of the data points with fewer encryptions than a higher level of encryption. For instance, a lowest level of encryption may include performing a computationally efficient encryption on less than half the data points, and a higher level of encryption may include performing three or more different computationally expensive encryptions on different sets of the data points that collectively represent all the data points of the point cloud. In some embodiments, encryption device 205 may be integrated as part of a secure system, and may automatically configure (at 1115) the one or more encryptions based on a configured level of security for the secure system.

Process 1100 may include selecting (at 1120) a next encryption from the configured list of encryptions. Process 1100 may include selecting (at 1125) a next set of the data points to encrypt using the selected encryption based on selection criteria associated with the selected encryption. The selection criteria may include a sequential or ordered selection (e.g., all data points, every other data point, etc.), or may include a deterministic selection of data points. For instance, the next set of data points may include a slice that corresponds to data points in a particular coordinate plane or region of the point cloud. In some embodiments, selecting (at 1125) the next set of data points may include encryption device 205 opening the received point cloud file, and scanning for data points that match the selection criteria configured for the selected encryption.

Process 1100 may include determining (at 1130) one or more encryption transformations to apply to the selected data points based on the selected encryption. The selected encryption may apply a static, deterministic, or dynamic adjustment to the selected data point data point elements, and may include a formula, algorithm, and/or parameters for determining the targeted data point elements of the selected data points and the adjustment to apply to the targeted data point elements. Determining (at 1130) the encryption transformations may include calculating or computing an adjustment to one or more data point elements of a selected data point based on the static, deterministic, or dynamic adjustment that is to be applied. Determining (at 1130) the encryption transformations may include processing and/or scanning the data points to identify data point elements that are subject to encryption or adjustment based on the selected encryption and/or data point elements of the data points.

Process 1100 may include encrypting (at 1135) the selected data points by applying the encryption transformations to adjust one or more data point elements of the selected data points. Encrypting (at 1135) the selected data points may include overwriting data point elements for the selected data points in the received point cloud file, or writing the adjusted data point elements for the selected data points and unadjusted data point elements for non-selected data points to a separate file storing the encrypted point cloud.

Process 1100 may include determining (at 1140) whether the selected encryption applies to another set of data points in the point cloud. For instance, determining (at 1130) the encryption transformations and encrypting (at 1135) the selected data points may be repeated for a particular encryption if the particular encryption involves selecting (at 1125) different sets of data points, determining (at 1130) different encryption transformation to apply to the selected slice or set of data points, and encrypting (at 1135) the set of data points before selecting a next slice or set of data points for the particular encryption, wherein the different encryption transformations may be based on different parameters that specify different adjustments to make to the data point elements for each set of selected data points (e.g., different slice rotations, different data point element modifiers for different sets of data points, etc.).

In response to determining (at 1140—Yes) the current encryption is to be applied to another set of data points, process 1100 may include selecting (at 1125) the next set of data points, determining (at 1130) the one or more encryption transformations to apply, and encrypting (at 1135) the selected set of data points. In response to determining (at 1140—No) that all data points of the point cloud subject to the current encryption have been encrypted, process 1100 may include adding (at 1145) to the encryption key. Adding (at 1145) to the encryption key may include providing (at 1145) an identifier that specifies the encryption that was applied. The identifier may identify the encryption that was applied, selection criteria for selecting the data points that were encrypted as part of the identified encryption, and/or parameters for determining the encryption transformations that were used to encrypt the selected data points. The identifier may be an encoded alphanumeric value. For instance, the identifier "E1S2P3" may use the encoded value "E1" to identify that a first data point element swap encryption was performed, the encoded value "S2" to identify that the selection criteria involved applying the first data point element swap encryption to every other data point, and the encoded value "P3" may specify that the x-coordinate value was swapped with the chrominance value. The encryption key identifier may have additional or different encoded values to define the application of different supported encryptions to the point cloud data points.

Process 1100 may include determining (at 1150) if encryption of the point cloud is incomplete. Encryption of the point cloud may be complete once each encryption from the configured list of encryptions has been used to adjust the data points of the point cloud, and may be incomplete if there is at least one additional encryption in the configured list of encryptions that has not been applied to the point cloud.

In response to determining (at 1150—Yes) that the point cloud encryption is incomplete, process 1100 may include selecting (at 1120) the next encryption from the configured list of encryptions, and performing the next encryption on the data points that were adjusted with the last encryption, thereby chaining multiple encryptions together and using different encryption techniques to further encrypt the data points and increase the level of encryption (e.g., increase the decryption difficulty and computation). Performing the next encryption may include selecting (at 1125), determining (at 1130), and encrypting (at 1135) the data points based on the next encryption.

In response to determining (at 1150—Yes) that encryption of the point cloud is complete, process 1100 may include storing (at 1155) the encrypted data points to an encrypted point cloud file, and providing (at 1160) the encryption key for decryption of the encrypted point cloud file. Storing (at 1155) the encrypted data points to an encrypted point cloud file may include overwriting the received point cloud file with the data point elements of the encrypted data points, or writing the encrypted data points to a new file. Providing (at 1160) the encryption key may include writing the encryption key with the identifier for each applied encryption to a separate file than the encrypted point cloud file, storing the encryption key in memory, storage, or decryption database, or embedding the encryption key as part of the encrypted point cloud file header, metadata, file extension, filename, or other data.

Decryption of the encrypted point cloud file may include performing an inverse of process 1100 in which the encrypted point cloud file is received with the encryption key, and the encryptions, that were performed to create the encrypted point cloud file, are performed in reverse order (e.g., last to first). In some embodiments, encryption device 205 and/or another decryption device may decode the last identifier that was added to the encryption key, may determine the encryption that was last applied as well as the selection criteria for the targeted data points and the transformation parameters used to adjust the data point elements of the targeted data points from the last identifier, may revert the data point element adjustments, and may repeat until all encryption identifiers from the encryption key have been used. The decryption may restore the data point elements of the data points that were adjusted by each encryption until the original data point elements for the data points of the unencrypted point cloud remain. The data point elements for the unencrypted data points can then be used to generate the original 3D image or rendering of the unencrypted point cloud.

In some embodiments, the point cloud encryption may be used to limit access to the 3D image or rendering of the unencrypted point cloud, rather than obfuscate or distort the 3D image or rendering. For instance, a user may wish to provide lower resolution previews of the 3D image or rendering, or may want to distribute the point cloud but limit the amount of information that is accessible to a certain group of users.

Figure 12:
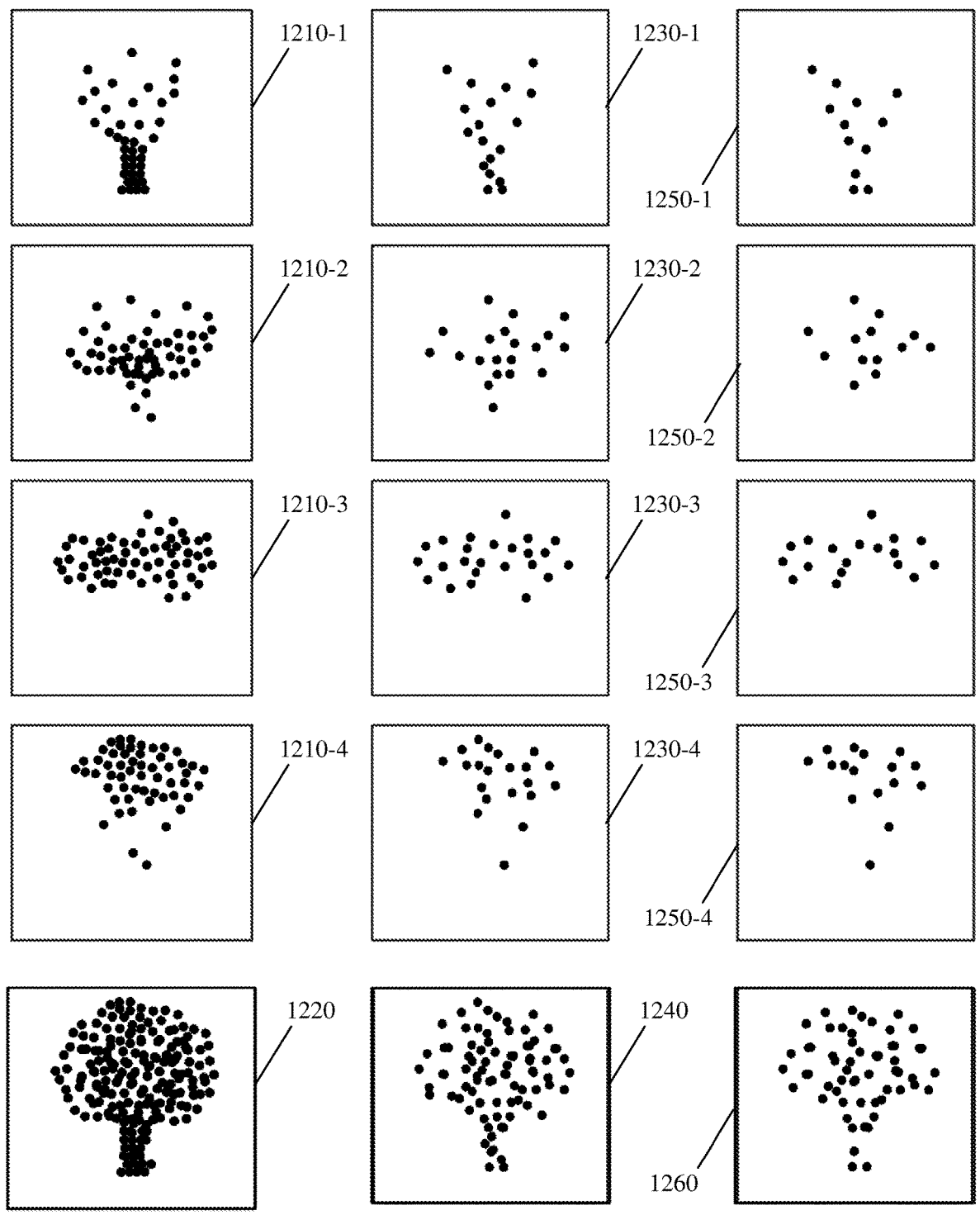
FIG. 12 illustrates providing access to different resolutions of a point cloud via encryption in accordance with some embodiments presented herein.

In some embodiments, encryption device 205 may encrypt the point cloud in a manner that reduces the resolution or amount of information that is accessible without obfuscating or entirely distorting the 3D image. In some such embodiments, encryption device 205 may perform a multi-stage encryption of a point cloud, and each additional encryption may hide or remove access to a greater number of data points. For instance, FIG. 12 illustrates slices 1210-1, 1210-2, 1210-3, and 1210-4 that collectively represent all data points of point cloud 1220. FIG. 12 further illustrates slices 1230-1, 1230-2, 1230-3, and 1230-4 after a first encryption of point cloud 1220. Slices 1230-1, 1230-2, 1230-3, and 1230-4 provide access to fewer data points than slices 1210-1, 1210-2, 1210-3, and 1210-4 as a result of the first encryption hiding or obfuscating a first set of data points from point cloud 1220. Accordingly, first encrypted point cloud 1240 may provide the original image or rendering of point cloud 1220 at a lower resolution, lower quality, or as a first proxy file or thumbnail of the original image. A second encryption may be applied to the data points of encrypted point cloud 1240 in order to produce slices 1250-1, 1250-2, 1250-3, and 1250-4 that provide access to fewer points than slices 1230-1, 1230-2, 1230-3, and 1230-4. Accordingly, second encrypted point cloud 1260 may further reduce the resolution or quality of the image that can be rendered from the accessible data points of encrypted point cloud 1240. Alternatively, second encrypted point cloud 1260 may represent a second proxy file or thumbnail of the original image.

The different resolution point clouds 1220, 1240, and 1260 may be stored as different files or contained in one file whereby the different resolution point clouds 1220, 1240, and 1260 may be decrypted and/or accessed depending on encryption keys or access permissions provided to different users or devices. For instance, second encrypted point cloud 1260 may be distributed to a set of users along with different encryption keys. A first user or device may receive second encrypted point cloud 1260 with no encryption key, and may therefore only be able to access the data points of second encrypted point cloud 1260 from which the lowest resolution image may be generated. A second user or device may receive second encrypted point cloud 1260 with an encryption key that includes a first identifier for reversing the second encryption in order to gain access to the data points of first encrypted point cloud 1240 from which the middle resolution image of first encrypted point cloud 1240 may be generated. A third user or device may receive second encrypted point cloud 1260 with an encryption key that includes a first identifier and a second identifier for reversing the second encryption and the first encryption in order to gain access to the data points of the original point cloud 1220 from which the original high resolution image of point cloud 1220 may be generated. In some embodiments, the encryption key with the first identifier and the second identifier may be distributed to all users and/or devices, but certain users or devices may be prevented from using one or more of the first identifier and the second identifier because of access privileges associated with the user or device. For instance, to initiate access to the point cloud, a user may be required to enter login credentials, and encryption device 205 may determine which encryption key identifiers may be used by that user based on the login credentials which, in turn, controls which of point clouds 1220, 1240, and 1260 that user may access.

In some embodiments, encryption device 205 may correspond to one or more devices with processors and/or specialized hardware (e.g., a graphical processing unit ("GPU")) for encrypting and decrypting point clouds and/or other files. Encryption device 205 may include a portable computing device, such as a personal digital assistant ("PDA"), a "smart" phone, a cellular phone, a laptop computer, a tablet computer, etc. Encryption device 205 may also include a non-portable computing device, such as a desktop computer, a consumer or business appliance, a "smart" television, a set-top box, a gaming device, or another device that can be used to access a point cloud and/or render the images thereof. In some embodiments, encryption device 205 may be implemented as part of a video card, GPU, application-specific integrated circuit ("ASIC"), or other hardware that can be used for point cloud encryption and/or decryption.

In some embodiments, encryption device 205 may be a software component that is executed by one or more processors in order to encrypt and/or decrypt point clouds and/or other files. In some such embodiments, encryption device 205 may be locally or remotely accessed by one or more user devices.

Figure 13:
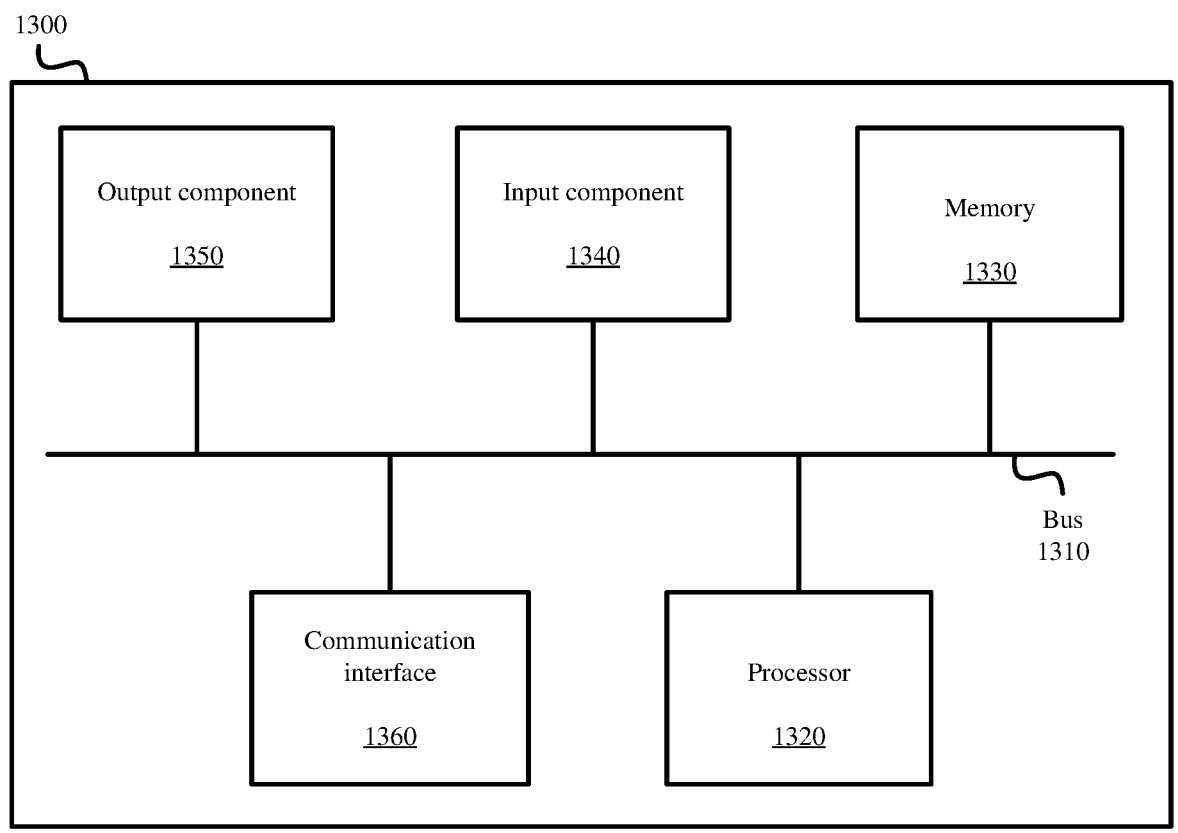
FIG. 13 illustrates example components of one or more devices, according to one or more embodiments described herein.

FIG. 13 is a diagram of example components of device 1300. Device 1300 may be used to implement one or more of the devices or systems described above (e.g., encryption device 205). Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, GPU, ASIC, video card, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display (e.g., 2D, 3D, virtual reality, augmented reality, holographic, etc.), a heads-up display, a projector, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
receiving a point cloud comprising a plurality of data points that collectively produce a three-dimensional ("3D") image, each data point of the plurality of data points comprising a set of elements with values that define a position of the data point in 3D space and visual characteristics of the data point;
selecting a set of the plurality of data points based on a first subset of the set of elements of each data point;
adjusting values of a different second subset of the set of elements for each data point of the set of data points using a deterministic transformation while retaining values of the first subset of elements for each data point of the set of data points; and generating an encrypted point cloud with the plurality of data points having adjusted values for the second subset of elements, and wherein the plurality of data points of the encrypted point cloud collectively produce a different 3D image than the plurality of data points of the point cloud.

2. The method of claim 1 further comprising:
generating an encryption key with an identifier that encodes selection criteria used in selecting the set of data points and the deterministic transformation applied to the second subset of elements.

3. The method of claim 2 further comprising:
decrypting the encrypted point cloud, wherein decrypting the encrypted point cloud comprises:
  selecting the set of data points from the plurality of data points of the encrypted point cloud based on the first subset of elements; and
  reversing said adjusting of the values for the second subset of elements of each data point in the set of data points.

4. The method of claim 1, wherein selecting the set of data points comprises:
performing a deterministic and reproducible selection of the set of data points based on one or more of an x-coordinate element, y-coordinate element, z-coordinate element, and non-positional elements from the set of elements.

5. The method of claim 1, wherein selecting the set of data points comprises:
performing a deterministic selection of the set of data points based on a pattern, and wherein the set of data points is less than all data points of the plurality of data points.

6. The method of claim 1, wherein adjusting the values comprises:
swapping the values of two different elements in the second subset of elements for each data point in the set of data points.

7. The method of claim 6, wherein swapping the values comprises:
swapping the values of a first pair of elements in the second subset of elements of a first data point in response to selecting the first data point in the set of data points; and
swapping the values of a different second pair of elements in the second subset of elements of a second data point in response to selecting the second data point in the set of data points.

8. The method of claim 6, wherein swapping the values comprises:
swapping the values of a first pair of elements in the second subset of elements for a particular data point based on a first value of a particular element in the first subset of elements of the particular data point; and
swapping the values of a different second pair of elements in the second subset of elements for the particular data point based on a different second value of the particular element in the first subset of elements of the particular data point.

9. The method of claim 1, wherein adjusting the values comprises:
modifying the value of a particular element in the second subset of elements for a particular data point based on a value of at least one other element in the first subset of elements of the particular data point.

10. The method of claim 1, wherein adjusting the values comprises:

rotating a first subset of the set of data points with a first rotation based on a first adjustment to the values of the second subset of elements of the first subset of data points; and
rotating a first subset of the set of data points with a different second rotation based on a second adjustment to the values of the second subset of elements of the first subset of data points.

11. The method of claim 1, wherein adjusting the values comprises:
determining an angle or distance between a starting point and each data point of the set of data points; and
setting an amount with which to adjust the values of the second subset of elements for a particular data point of the set of data points based on the angle or distance between the starting point and the particular data point.

12. The method of claim 1, wherein adjusting the values comprises:
determining different pairs of the set of data points;
replacing the values of the second subset of elements for a first data point in a particular pair with the values of the second subset of elements from a second data point in the particular pair; and
replacing the values of the second subset of elements for the second data point in the particular pair with the values of the second subset of elements from the first data point in the particular pair.

13. The method of claim 1 further comprising:
configuring at least a first encryption and a second encryption of the point cloud;
adjusting the values of a third subset of the set of elements using a second deterministic transformation of the second encryption that is different than the deterministic transformation of the first encryption; and
wherein generating the encrypted point cloud comprises:
  generating the encrypted point cloud with a first level of encryption based on the plurality of data points having the values for the second subset of elements adjusted with the deterministic transformation of the first encryption; and
  generating the encrypted point cloud with a second level of encryption based on the plurality of data points having the values for the second subset of elements adjusted with the deterministic transformation of the first encryption and the values for the third subset of elements adjusted with the second deterministic transformation of the second encryption.

14. The method of claim 1, wherein the set of data points is a first set of data points and the deterministic transformation is a first deterministic transformation, the method further comprising:
selecting a different second set of the plurality of data points based on the first subset of the set of elements of each data point;
adjusting values of the second subset of elements for each data point of the second set of data points using a different second deterministic transformation; and
wherein generating the encrypted point cloud comprises:
  encrypting the plurality of data points using the values for the second subset of elements of the first set of data points adjusted with the first transformation and the values for the second subset of elements of the second data points adjusted with the second transformation.

15. The method of claim 1, wherein the deterministic transformation is a first deterministic transformation, the method further comprising:

modifying adjusted values of the second subset of elements, that result from said adjusting with the first deterministic transformation, using a second deterministic transformation; and wherein generating the encrypted point cloud comprises:
encrypting the plurality of data points using the values for the second subset of elements of the set of data points that are adjusted with the first transformation and that are subsequently modified with the second transformation.

16. A device comprising:
one or more processors configured to:
  receive a point cloud comprising a plurality of data points that collectively produce a three-dimensional ("3D") image, each data point of the plurality of data points comprising a set of elements with values that define a position of the data point in 3D space and visual characteristics of the data point;
  select a set of the plurality of data points based on a first subset of the set of elements of each data point;
  adjust values of a different second subset of the set of elements for each data point of the set of data points using a deterministic transformation while retaining values of the first subset of elements for each data point of the set of data points; and
  generate an encrypted point cloud with the plurality of data points having adjusted values for the second subset of elements, and wherein the plurality of data points of the encrypted point cloud collectively produce a different 3D image than the plurality of data points of the point cloud.

17. The device of claim 16, wherein the one or more processors are further configured to:
  generate an encryption key with an identifier that specifies selection criteria used in selecting the set of data points and the deterministic transformation applied to the second subset of elements.

18. The device of claim 17, wherein the one or more processors are further configured to:
  decrypt the encrypted point cloud using the encryption key, wherein decrypting the encrypted point cloud comprises:
    selecting the set of data points from the plurality of data points of the encrypted point cloud based on the first subset of elements and the selection criteria from the encryption key; and
    reversing said adjusting of the values for the second subset of elements of each data point in the set of data points based on the deterministic transformation specified as part of the encryption key.

19. The device of claim 16, wherein adjusting the values comprises:
  modifying the value of a particular element in the second subset of elements for a particular data point based on a value of at least one other element in the first subset of elements of the particular data point.

20. A non-transitory computer-readable medium, storing a plurality of processor-executable instructions to:
  receive a point cloud comprising a plurality of data points that collectively produce a three-dimensional ("3D") image, each data point of the plurality of data points comprising a set of elements with values that define a position of the data point in 3D space and visual characteristics of the data point;
  select a set of the plurality of data points based on a first subset of the set of elements of each data point;
  adjust values of a different second subset of the set of elements for each data point of the set of data points using a deterministic transformation while retaining values of the first subset of elements for each data point of the set of data points; and
  generate an encrypted point cloud with the plurality of data points having adjusted values for the second subset of elements, and wherein the plurality of data points of the encrypted point cloud collectively produce a different 3D image than the plurality of data points of the point cloud.

* * * * *